Sept. 23, 1958 W. H. SHAPERO 2,853,187
FLEXIBLE TUBE CONTAINER AND METHOD OF MAKING THE SAME
Filed March 29, 1954

INVENTOR.
WALLACE H. SHAPERO
BY
Lynn & Latta
ATTORNEY

United States Patent Office

2,853,187
Patented Sept. 23, 1958

2,853,187

FLEXIBLE TUBE CONTAINER AND METHOD OF MAKING THE SAME

Wallace H. Shapero, Los Angeles, Calif., assignor to Wallace Container Company, Santa Ana, Calif., a corporation of California Application March 29, 1954, Serial No. 419,515

2 Claims. (Cl. 206—80)

This invention relates to flexible containers and methods of fabricating the same, and has as its primary object to provide an extremely simple and inexpensive container and method of making the same.

Another object is to provide a package comprising a hermetically sealed flexible tube container and a body of liquid which may be of a viscous type such as oil paint, filling the same and adapted to be pressure-extruded through a small discharge aperture formed by shearing off one end of the container.

More specifically, the invention aims to provide such a container, hermetically sealed after filling by an extremely simple and inexpensive means and method.

A further object is to provide such a container having a delivery outlet of extremely simple and inexpensive construction.

A more specific object is to provide such a container embodying means to provide a delivery outlet, established by severing the container on a line transverse to its major axis.

More specifically the invention aims to provide a container of a flexible synthetic resin plastic material, sealed by heat welding the opposed internal wall surfaces thereof together on a line transverse to its major axis and having means, developed during the sealing operation, to form a restricted dispensing outlet when the container is severed on a transverse line.

A further object is to provide a container especially adapted for attachment in a simple way, to a display panel, card or container.

Other objects will become apparent in the ensuing specifications and appended drawings in which.

Figure 1:
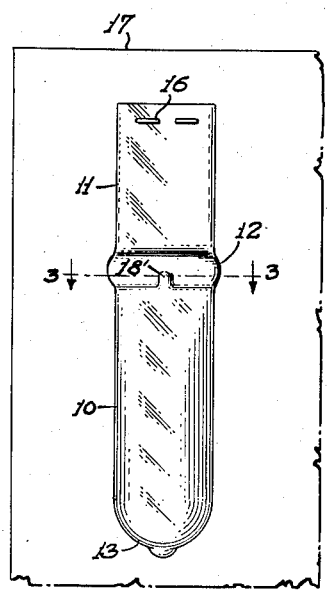
Fig. 1 is a side view of my improved container, as mounted on a display card.

Referring now to the drawings in detail, and particularly to Fig. 1, I have shown therein, as an example of one form in which the invention may be embodied, a container including a body portion 10, a head portion 11, and a seam 12 intervening between the head portion 11 and container body 10 and hermetically sealing the latter from the former. The container is filled with a liquid, indicated at 25.

Figure 7:
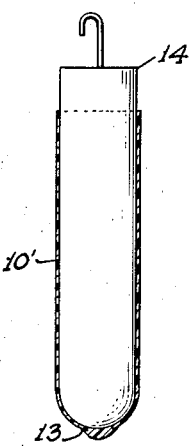
Fig. 7 is a view showing the dip-forming of the original container tube.

As initially formed, the container (Fig. 7) is in the form of a tube 10' having the closed bottom 13 formed integrally thereon by dipping a mandrel 14 into a body of liquid film forming material having the property of hardening or coagulating to form a tough, strong moisture impervious film to constitute the wall of the container, and having the further property of having its opposed inner wall surfaces become welded together when brought into contact and subjected to heat or pressure or both, whereby the hermetically sealed seam 12 may be formed across the full width of the tube body 10' to separate the same into the closed container body 10 and the head portion 11 having a free end which may be allowed to remain open, and is left thus in the embodiment shown, and in most applications.

As illustrated in Fig. 1, the head portion 11 provides a flap by means of which the container may be attached (either adhesively or by means of a staple 16) to a display card 17. Card 17 may function as a counter display support or for supporting several of the containers in assembly on a panel which may be enclosed in a suitable packaging container such as a shallow pasteboard box.

At this point it may be pointed out that the invention provides a very inexpensive container for a multitude of uses where it may be desirable to mount one or more of the containers on a supporting card or the like for distribution to consumers in group collections. For example, the container bodies 10 may contain dyes or paints of various colors for artists' painting kits, for Easter egg coloring kits, and for other equally desirable uses. By having the several containers secured to a mounting card, they may be conveniently maintained in a preselected arrangement such that the most desirable display of a group may be maintained.

Figure 4:
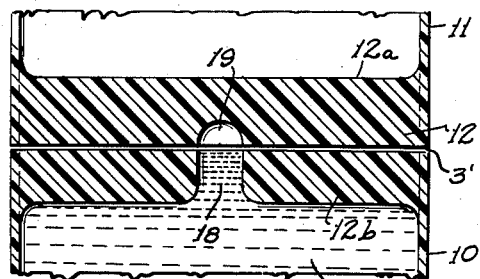
Fig. 4 is an enlarged fragmentary sectional view of the outlet end of the container, taken in the plane of welding of the opposed walls thereof together.
Figure 3:
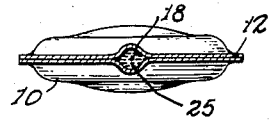
Fig. 3 is a transverse sectional view taken on line 3—3 of Fig. 1.
Figure 2:
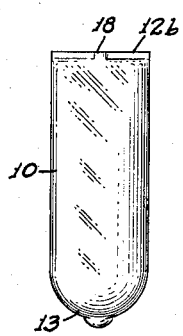
Fig. 2 is a view of the container with a delivery outlet formed by severing the head portion from the body portion of the container.

Referring now to Figs. 2, 3 and 4, the container, though hermetically sealed in its original finished form shown in Fig. 1, may be converted into a container with an outlet 18 as the result of a very simple operation of severing the head 11 from the container body 10 along the line transverse to the major axis of the container, as indicated by the line 3—3 of Fig. 1. This is first illustrated in Fig. 4, which shows the seam 12 divided longitudinally, by a transverse cut 3', into a section 12a which remains part of the head section 11 of the container and a section 12b which remains a part of the body portion 10 of the container. The section 12a of the weld extends continuously from one side of the container to the other, whereas the section 12b is interrupted by the outlet 18, normally disposed midway between the ends thereof. In the filled container of Fig. 1, the outlet 18 constitutes the base portion of a closed pocket or recess, having a closed end portion 19 which is separated from the body thereof to form the outlet 18 when the cut 3' is made. Thus, the cut 3' must intersect the closed pocket 18'.

Figure 6:
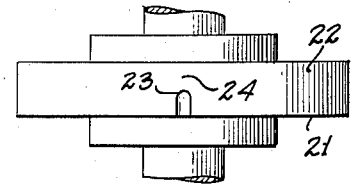
Fig. 6 is a peripheral view of one of the rolls.

The seam 12 and pocket 18', are simultaneously formed by seam welding transversely across the body 10' after the contents have been inserted into the container. This may be done for example by passing the upper portion of the container tube 10' between a pair of heated welding rolls 21, 21' each having cylindrical peripheries 22, 22' (Fig. 6) provided therein with recesses 23, 23' each having one end opening into one lateral face of the respective roll 22, 22', and having the other end closed and spaced from the opposite side face of the roll so that, on that side, the cylindrical periphery 22 or 22' extends continuously past the recess 23, at 24. Any suitable means may be utilized for indexing the rolls to a starting position such that, with the tube inserted between the rolls until one side thereof is engaged between the adjoining cylindrical surfaces 22, 22', and with subsequent rotation of the rolls, the tube will be drawn between the rolls in such a manner as to locate the pocket 18' at any selected point between the side margins of the tube, e. g. midway therebetween. It will be understood however that if desired, the outlet 18 may be caused to register with one side margin of the tube, so that the outlet in the completed tube is in one corner thereof instead of the middle of the forward end.

Figure 5:
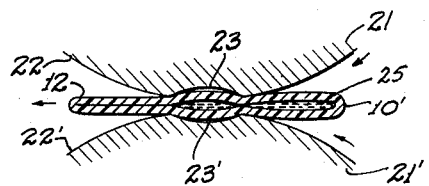
Fig. 5 is a sectional view of a pair of welding rolls, with one of my improved containers being heat sealed therebetween.

A suitable material for the container, having the desired characteristics of flexibility, strength, toughness, moisture retention, and the ability to be heat-sealed, is a plasticized vinyl chloride resin. Other thermoplastic resins having suitable heat sealing or pressure sealing properties may be used. For example, it would be feasible to employ a raw latex tube, to pressure seal it between rolls such as those of Fig. 5, with a pattern such as to leave a pocket 18' therein, and to subsequently allow the natural curing processes to age the inner surface of pocket 18' to the point where the opposed surfaces thereof will not become accidentally sealed together if subjected to incidental pressure during handling. Alternatively, the contents could be such as to cure the inner surfaces to a non-adhesive state.

By utilizing a tube having a relatively thin wall and of quite high flexibility and by adjusting the rolls 22, 22' sufficiently close to apply fairly heavy compression to the tube, the seam 12 may be developed completely from one side margin to the other of the tube as it is flattened between the rolls 22, 22', and caused to become integral with the side margins of the tube as indicated in Fig. 4, thereby providing a complete hermetic seal entirely across the tube.

The sealed container, with contents, is circular or elliptical in cross section at bottom 13, and is flat adjacent seam 12.

By sealing of the tube to form the seam 12 comprising double wall thickness welded into what is in effect a single integral body of double thickness material extending from side to side of the tube, the head portion 11 tends to remain in a flattened state, whereby it may function handily as a flap for use as a handle or as a support for attaching the container to a mounting card as aforesaid.

Fig. 3 may be regarded as an end view of the container after it has been opened, and illustrates the outlet 18 as it would appear under the influence of pressure applied to the body of the tube to squeeze out the contents thereof through the outlet. When pressure is not applied, the lips of container wall material defining the respective sides of outlet 18 will tend to close together to close the outlet 18.

In the sealing operation it will ordinarily be desirable to have the rolls 22, 22' arranged in a common horizontal plane so that the tube in being passed therebetween may be maintained in an upright position suspended by its head flap 11, which is particularly adaptable to being clamped between a pair of jaws of a conveyor hanger in a semi-automatic welding apparatus. The head portion 11 may thus constitute the means for suspending the tube as it is passed between the welding rolls, the body portion 10 being freely pendant with its contents below the plane of the rolls.

I claim:

1. In combination: a body of fluid material of oily texture; a flexible tube type dispensing container enclosing said oily body, said container comprising a body portion of seamless substantially uniform diameter tubing of heat sealable vinyl chloride thermoplastic resin film material, an unseamed bottom extending as an integral continuation of said body portion and closing the lower end of said container, a narrow rectangular flat seam extending from side to side of said body portion at the top end thereof, said seam being constituted of welded opposed wall portions of said body and being of uniform width throughout its length except at substantially the midpoint thereof, said container having a chamber defined by said body portion, bottom and seam, and having a narrow pocket disposed substantially at said midpoint, said pocket having side walls substantially parallel to the longitudinal axis of said container and to one another, said pocket being contained within the area of said seam, communicating with said containing chamber at one side of the seam, and extending from said one side part way across the width of the seam and terminating short of the other side thereof so as to be closed by said seam at its outer end, and a flattened tubular head portion integral with said seam and extending from said other side thereof in alignment with said body portion, said body portion and head portion having portions flaring away from the respective faces of said seam at respective sides thereof and defining parallel transverse shoulders operative as visual guides for cutting said seam along its longitudinal axis to sever said head portion from said body portion and to open said pocket to provide a dispensing aperture; a mounting panel; and a fastener piercing said head portion adjacent the end thereof, secured in said panel, and holding said head portion in flattened condition against said panel for suspending the container on the panel.

2. In combination: a body of fluid material of oily texture; and a flexible tube type dispensing container enclosing said oily body, said container comprising a body portion of seamless substantially uniform diameter tubing of heat sealable vinyl chloride thermoplastic resin film material, an unseamed bottom extending as an integral continuation of said body portion and closing the lower end of said container, a narrow rectangular flat seam extending from side to side of said body portion at the top end thereof, said seam being constituted of welded opposed wall portions of said body and being of uniform width throughout its length except at substantially the midpoint thereof, said container having a containing chamber defined by said body portion, bottom and seam, and having a narrow pocket disposed substantially at said midpoint, said pocket having side walls substantially parallel to the longitudinal axis of said container and to one another, said pocket being contained within the area of said seam, communicating with said containing chamber at one side of the seam, and extending from said one side part way across the width of the seam and terminating short of the other side thereof so as to be closed by said seam at its outer end, and a flattened tubular head portion integral with said seam and extending from said other side thereof in alignment with said body portion, said body portion and head portion having portions flaring away from the respective faces of said seam at respective sides thereof and defining parallel transverse shoulders operative as visual guides for cutting said seam along its longitudinal axis to sever said head portion from said body portion and to open said pocket to provide a dispensing aperture; said head portion being adapted to be fastened flatly against the face of a supporting panel for suspending the container.

References Cited in the file of this patent

UNITED STATES PATENTS

| Number | Name | Date |
|---|---|---|
| 820,067 | Richardson | May 8, 1906 |
| 1,909,726 | Serenyi | May 16, 1933 |
| 2,103,389 | Salfisberg | Dec. 28, 1937 |
| 2,113,636 | Vogt | Apr. 12, 1938 |
| 2,261,466 | Habib | Nov. 4, 1941 |
| 2,297,375 | Vogt | Sept. 29, 1942 |
| 2,313,792 | Winder | Mar. 16, 1943 |
| 2,325,021 | Salfisberg | July 20, 1943 |
| 2,387,812 | Sonneborn et al. | Oct. 30, 1945 |
| 2,397,051 | Scherer | Mar. 19, 1946 |
| 2,430,995 | Roos | Nov. 18, 1947 |
| 2,476,774 | Sears | July 19, 1949 |
| 2,539,513 | Jenett | Jan. 30, 1951 |

FOREIGN PATENTS

| Number | Country | Date |
|---|---|---|
| 177,438 | Switzerland | Aug. 1, 1935 |
| 952,182 | France | Apr. 25, 1949 |